UNITED STATES PATENT OFFICE.

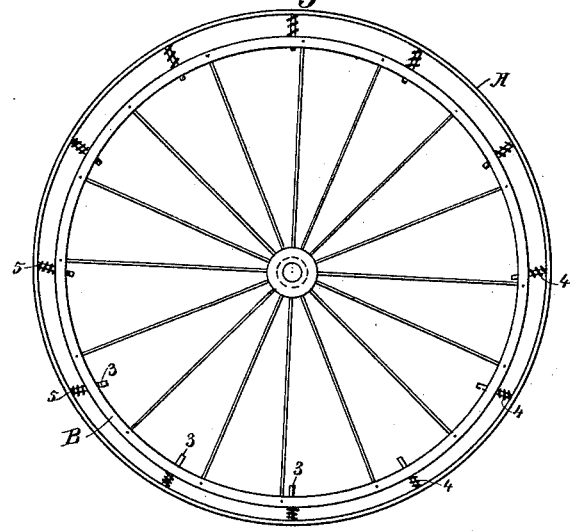

WILLIAM MORCK, OF OAKLAND, CALIFORNIA, ASSIGNOR OF ONE-THIRD TO GEORGE E. DE GOLIA, OF OAKLAND, CALIFORNIA.

ELASTIC VEHICLE-TIRE.

SPECIFICATION forming part of Letters Patent No. 686,825, dated November 19, 1901.

Application filed April 10, 1901. Serial No. 55,143. (No model.)

*To all whom it may concern:*

Be it known that I, WILLIAM MORCK, a citizen of the United States, residing in the city of Oakland, county of Alameda, State of California, have invented an Improvement in Elastic Vehicle-Wheels; and I hereby declare the following to be a full, clear, and exact description of the same.

My invention relates to improvements in vehicle-wheels; and it consists in a means for making such wheels elastic with relation to the tread or part which travels upon the ground.

It consists in the employment of concentric rims, one forming the tread and the other located at a short distance interior thereto, radially-sliding springs surrounding connecting-rods, means whereby said rods, in addition to being slidable through the inner rim, have a swinging movement in the plane of the rims, and means for reducing the friction of the sliding movement.

It also comprises details of construction which will be more fully explained by reference to the accompanying drawings, in which—

Figure 1 is a view of my wheel. Fig. 2 is a longitudinal section of a portion of the wheel. Fig. 3 is a section at right angles to Fig. 2.

A is an outer rim, which may be made of any suitable or desired material and which may be constructed to carry a cushion or elastic tire of any description, as at 2. Located at a suitable distance within this rim A is a second rim B of smaller diameter, and this rim is retained in a position normally concentric with the outer one by means of short rods 3 and surrounding spiral springs 4, which fit between the two rims and have sufficient tension to retain the rims at the proper distance apart. It will be understood that the tension of these springs 4 will be sufficient for the load to be carried. The interior rim is provided with a hub and spokes of any suitable or desired description, which connect the inner rim and hub, making this portion of the wheel rigid, while the rods 3 serve to connect the inner and outer rim, as before described. There may be as many of these connecting-rods as found desirable or necessary, as from ten or twelve up.

The operation of the device will then be as follows: The weight carried upon the wheel-hub and transmitted thence to the inner rim B will be again transmitted through the rods 3 and springs 4 to the outer rim, and the springs will be compressed successively as they arrive at the bottom of their travel, so as to provide an elastic support for the weight. It will be seen that by the compression of these springs the inner rim will be constantly moved toward the outer one at the bottom and will practically be eccentric to the outer rim while the weight is upon it, and this constantly-changing eccentricity of the inner rim makes it necessary to provide for the consequent change of position of the rods 3. I have therefore shown these rods as hinged at the outer end, as by means of lugs 5, projecting inwardly from the rim A, so that they may turn in the plane of the wheel-rims or in the line of travel. The inner ends of the rods are loosely slidable within the inner rim, as at 6, and within the inner rim and located so as to contact with the inner ends of the rods 3 are rollers 7 or equivalent antifrictional guides, between which the inner ends of the rods are slidable, while by the hinged connection with the outer rim they are allowed a freedom of motion in the line of travel, so that the rims may constantly change their position with relation to each other, and during these changes the rods 3 will tilt from side to side about their hinge-points.

I have here shown the inner rim as made channeled or box-shaped in transverse section; but it will be manifest that either or both the rims may be made of any suitable cross-section adapted for the purpose.

Having thus described my invention, what I claim as new, and desire to secure by Letters Patent, is—

1. The combination in a wheel of an inner rim, with which the radial spokes from the hub are connected, an exterior rim, rods yieldingly connected with the outer rim and slidable through the inner rim, springs encompassing the rods between the two rims, and means carried by the inner rim for reducing the friction of the sliding movements of the rods.

2. The combination in a vehicle-wheel of an inner rim with which the spokes radiating from the hub are connected, an exterior rim in the same plane, rods slidable through openings in the inner rim having hinged connections with the outer rim, a roller-guide for said rods, and spiral springs surrounding said rods between the outer and inner rims.

3. The combination in a vehicle-wheel of an inner rim with which the spokes radiating from the hub connect, an outer rim, rods having the outer ends hinged to the outer rim, the inner ends slidable through openings in the inner rim, guide-rollers journaled in the inner rim between which rollers the inner ends of the rods are movable, and spiral springs surrounding the rods and abutting against the inner and outer rims.

In witness whereof I have hereunto set my hand.

WILLIAM MORCK.

Witnesses:
E. J. FLANIGAN,
DAVID F. McWADE.